US007725271B2

(12) United States Patent
Yang et al.

(10) Patent No.: US 7,725,271 B2
(45) Date of Patent: May 25, 2010

(54) NOZZLE SNAP FLOW COMPENSATION

(75) Inventors: Zhou Yang, Oak Ridge, NC (US); John Steven McSpadden, Kernersville, NC (US); Thomas J. Park, Greensboro, NC (US); Vance A. Tate, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 178 days.

(21) Appl. No.: 11/939,345

(22) Filed: Nov. 13, 2007

(65) Prior Publication Data

US 2009/0125153 A1 May 14, 2009

(51) Int. Cl.
*G06F 1/00* (2006.01)

(52) U.S. Cl. ........................ 702/45; 73/861.79; 702/50; 715/771

(58) Field of Classification Search .................. 702/35, 702/45, 55, 100; 700/241, 236; 141/14, 141/59, 94, 192; 222/1.14, 52; 377/2; 73/40.5 R, 73/861, 861.77, 861.79; 137/12, 14, 234.6; 123/381; 427/208.6; 715/771
See application file for complete search history.

(56) References Cited

U.S. PATENT DOCUMENTS 3,939,649 A 2/1976 McCabe
3,940,020 A 2/1976 McCrory et al.
4,885,943 A 12/1989 Tootell et al.
4,971,005 A 11/1990 Dyer et al.
5,038,971 A 8/1991 Gayer et al.
5,157,958 A 10/1992 Geisinger
5,390,532 A 2/1995 Anthony
5,447,062 A 9/1995 Kopl et al.
5,689,071 A 11/1997 Ruffner et al.
5,717,564 A 2/1998 Lindale
5,734,851 A 3/1998 Leatherman et al.
5,954,080 A 9/1999 Leatherman (Continued)

FOREIGN PATENT DOCUMENTS

JP 2004-257525 A 9/2004

(Continued)

OTHER PUBLICATIONS

Futoshi et al., JP 2004-257526, "Gas supply device and method for controlling the same", Date of publication: Sep. 16, 2004, Detail English translation, 22 pages.*

(Continued)

*Primary Examiner*—John H Le
(74) *Attorney, Agent, or Firm*—Nelson Mullins Riley & Scarborough, LLP

(57) ABSTRACT

A fuel dispenser including a fuel delivery path configured to deliver fuel to a vehicle, a display configured to display the total dispensed fuel volume, and a fuel meter configured to measure a fuel delivery rate. A data set having a plurality of fuel volume compensation values corresponding to a plurality of fuel delivery rate values, and a microprocessor configured to calculate a volume of fuel dispensed and retrieve a fuel volume compensation value. The fuel meter measures the fuel delivery rate at the time of the event, the microprocessor determines which fuel delivery rate value corresponds to the fuel delivery rate, retrieves the corresponding fuel volume compensation value, and adds the retrieved fuel volume compensation value to the calculated volume of fuel dispensed to obtain the total dispensed fuel volume.

10 Claims, 8 Drawing Sheets

U.S. PATENT DOCUMENTS

| | | | |
|---|---|---|---|
| 5,956,259 | A | 9/1999 | Hartsell, Jr. et al. |
| 5,992,479 | A | 11/1999 | Simpson |
| 6,052,629 | A | 4/2000 | Leatherman et al. |
| 6,098,467 | A | 8/2000 | Wallen |
| 6,148,801 | A | 11/2000 | Wenzlawski |
| 6,227,227 | B1 | 5/2001 | Poleshuk et al. |
| 6,302,165 | B1 | 10/2001 | Nanaji et al. |
| 6,375,434 | B1 | 4/2002 | Taivalkoski et al. |
| 6,435,204 | B2 | 8/2002 | White et al. |
| 6,463,389 | B1 | 10/2002 | Dickson |
| 6,542,832 | B1 | 4/2003 | LaMothe |
| 6,575,206 | B2 | 6/2003 | Struthers et al. |
| 6,712,084 | B2 | 3/2004 | Shajii et al. |
| 6,721,669 | B2 | 4/2004 | Kopl et al. |
| 6,854,342 | B2 | 2/2005 | Payne et al. |
| 6,935,191 | B2 | 8/2005 | Olivier et al. |
| 7,010,961 | B2 | 3/2006 | Hutchinson et al. |
| 7,028,561 | B2 | 4/2006 | Robertson et al. |
| 7,048,964 | B2 | 5/2006 | McGlinchy et al. |
| 7,073,392 | B2 | 7/2006 | Lull et al. |
| 7,152,004 | B2 | 12/2006 | Reichler et al. |
| 2003/0114946 | A1 | 6/2003 | Kitchen |
| 2004/0256003 | A1 | 12/2004 | Shajii et al. |
| 2005/0028610 | A1 | 2/2005 | Olivier et al. |
| 2005/0223813 | A1 | 10/2005 | Lull et al. |
| 2006/0093742 | A1 | 5/2006 | McGlinchy et al. |
| 2007/0113554 | A1 | 5/2007 | Yates et al. |
| 2007/0128050 | A1 | 6/2007 | Cedrone et al. |

FOREIGN PATENT DOCUMENTS

| | | | |
|---|---|---|---|
| JP | 2004-257526 | A | 9/2004 |

OTHER PUBLICATIONS

International Search Report and Written Opinion dated Jan. 6, 2009, corresponding PCT Application No. US2008/083103, International Filing Date Nov. 8, 2008.

Co-pending U.S. Appl. No. 11/737,986, filed Apr. 20, 2007.

International Search Report and Written Opinion of International Searching Authority dated Aug. 14, 2008, corresponding to co-pending PCT application application serial No. PCT/US2008/004696 filed Apr. 10, 2008 .

Non-Final Office Action for co-pending U.S. Appl. No. 11/737,986, dated Sep. 17, 2008.

Request for Reconsideration of Non-Final Office Action for co-pending U.S. Appl. No. 11/737,986, filed Jan. 21, 2009 .

Final Office Action for co-pending U.S. Appl. No. 11/737,986, dated May 5, 2009.

* cited by examiner

NOZZLE SNAP FLOW COMPENSATION

FIELD OF THE INVENTION

The present invention generally relates to accurately measuring a volume of fuel dispensed through a fuel dispenser. More particularly, the present invention relates to compensating the total volume of fuel dispensed, as measured by the fuel dispenser, for events that occur during fueling that can adversely effect the accuracy of the total volume measured.

BACKGROUND OF THE INVENTION

In a typical fuel dispensing transaction, a customer arranges for payment, either by paying at the fuel dispenser with a credit card or debit card, or by paying a cashier. Next, a fuel nozzle is inserted into the fill neck of the vehicle, or other selected container, and fuel is dispensed. Displays on the fuel dispenser indicate how much fuel has been dispensed as well as a dollar value of the purchase. Dependent upon the timing and manner of payment for the fuel, either the customer terminates the flow of fuel into the vehicle by manually releasing the fuel nozzle, or the fuel dispenser automatically terminates the flow of fuel either at a pre-selected dollar amount or when the tank of the vehicle is full. In either case, the closing of the fuel valve within the fuel nozzle is herein referred to as a "nozzle snap event."

During such operations, a series of valves are opened and closed along the fuel flow path within the fuel dispenser. Referring now to FIG. 1, a schematic of a typical prior art fuel dispenser 100 is shown. As shown, fuel is pumped from an underground storage tank 102 through a fuel pipe 104 to a flexible fuel hose 105 which terminates with a fuel nozzle 106 including a fuel valve 108. To initiate fuel flow, the customer manually activates a trigger on fuel nozzle 106 which opens fuel valve 108 so that fuel is dispensed into the vehicle. Fuel flow through fuel valve 108 is detected by a flow switch 116 which, as shown, is a one-way check valve that prevents rearward flow through fuel dispenser 100. Once fuel flow is detected, flow switch 116 sends a signal on communication line 124 to a control system 120. Control system 120 is typically a microprocessor, a microcontroller, or other electronics with associated memory and software programs. Upon receiving the flow initiation signal from flow switch 116, control system 120 starts counting the pulses from a pulser 118. The pulses are generated by the rotation of a fuel meter 114 and are directly proportional to the fuel rate being measured.

As is known, fuel dispensers keep track of the amount of fuel dispensed so that it may be displayed to the customer along with a running total of how much the customer will have to pay to purchase the dispensed fuel. This is typically achieved with fuel meter 114 and a pulser 118. When fuel passes through fuel meter 114, it rotates and pulser 118 generates a pulse signal, with a known number of pulses being generated per gallon of fuel dispensed. The number of pulse signals generated and sent to control system 120 on communication line 126 are processed to arrive at an amount of fuel dispensed and an associated cost to the customer. These numbers are displayed to the customer to aid in making fuel dispensing decisions. As well, control system 120 uses the information provided by fuel meter 114 to regulate the operation of valve 112 during fueling operations.

As shown, fuel dispenser 100 includes a turbine style fuel meter 114, such as that disclosed in U.S. Pat. No. 7,028,561, which is hereby incorporated by reference in its entirety. Flow switch 116 is used in conjunction with turbine fuel meter 114 since the possibility exists that the rotors (not shown) of fuel meter 114 can bind during use, yet still allow fuel to pass through the meter. As such, pulser 118 does not create pulses, and the flow of fuel can go undetected. However, fuel switch 116 detects fuel flow and sends a signal to control system 120, allowing control system 120 to detect the flow error. Other designs of non-positive displacement type fuel meters can be prone to this same issue.

Fuel flow through fuel nozzle 106 is terminated by a nozzle snap event, that event being caused either manually by the customer or automatically by fuel dispenser 100. As fuel valve 108 snaps shut, fuel flow through flow switch 116 begins to decrease and flow switch 116 begins to shut. As flow switch 116 shuts, it generates a signal that indicates to control system 120 that fuel flow is being terminated. In response, control system 120 disregards any additional pulse signals that are generated by pulser 118.

Potential inaccuracies may exist when attempting to determine the total volume of fuel dispensed from the typical fuel dispenser discussed above when nozzle snaps occur. A typical fuel supply pressure for fuel dispenser 100 is 30 pounds per square inch (psi) upstream of valve 112. As fuel is dispensed at increasing flow rates, the pressure differential between the fuel supply pressure and the fuel pressure at flow valve 108 increases. As shown in FIG. 2, a pressure differential of approximately 3 psi exists at a steady state flow rate of 2 gallons per minute (gpm), whereas at a flow rate of 10 gpm, the pressure differential is approximately 15 psi. When flow is terminated by a nozzle snap event, system pressure is equalized until fuel pressure along the entire fuel flow path is approximately equal to the supply pressure, in this case 30 psi. This occurs as fuel is added to the fuel flow path downstream of fuel meter 114 through flow switch 116.

The additional volume of fuel added downstream of fuel meter 114 as pressure is equalized within the system is not added to the total volume of fuel dispensed, as measured by the fuel meter, since flow switch 116 sends a signal to control system 120 at the occurrence of the nozzle snap event indicating that further pulses from the fuel meter should be ignored. The additional, undetected volume of fuel is then dispensed to the tank of the vehicle when fuel flow is reinitiated. As seen in FIG. 2, the volume of fuel required for system pressure equalization increases along with the increase in the pressure differential between the fuel supply pressure and the fuel pressure at fuel valve 108. Because the noted pressure differential increases as the flow rate at which fuel is dispensed increases, inaccuracies in measuring the total volume of fuel dispensed typically increase as the flow rate at which the fuel is being dispensed increases with nozzle snaps.

SUMMARY OF THE INVENTION

The present invention recognizes and addresses considerations of prior art constructions and methods. In one embodiment of the present invention, a fuel dispenser is configured to compensate a total dispensed fuel volume for an event that occurs during a fueling process. The fuel dispenser includes a fuel delivery path configured to deliver fuel to a vehicle, a display configured to display the total dispensed fuel volume, and a fuel meter configured to measure a fuel delivery rate at which fuel is being dispensed through the fuel delivery path to the vehicle. A data set has a plurality of fuel volume compensation values corresponding to a plurality of fuel delivery rate values, and a microprocessor is configured to calculate a volume of fuel dispensed to the vehicle based on the fuel delivery rate and retrieve a fuel volume compensation value from the data set. The fuel meter measures the fuel delivery rate at the time of the event, the microprocessor determines which fuel delivery rate value corresponds to the fuel delivery rate, retrieves the corresponding fuel volume compensation value, and adds the retrieved fuel volume compensation value to the volume of fuel dispensed as calculated by the microprocessor to obtain the total dispensed fuel volume.

In another embodiment, a method of compensating a volume of fuel measured by a fuel meter to obtain a total dispensed fuel volume for a fuel dispenser including a fuel flow path for dispensing fuel, includes detecting an event that occurs during a fueling operation, measuring a flow parameter value of the fuel within the fuel flow path at the time of the event, retrieving a fuel volume compensation value from a data set including a plurality of fuel volume compensation values that correspond to a plurality of flow parameter values, and adding the retrieved fuel volume compensation value to the volume of fuel measured by the fuel meter to obtain a total dispensed fuel volume. The retrieved fuel volume compensation value is selected by comparing the measured flow parameter value to the plurality of flow parameter values in the data set.

Other objects, features and aspects for the present invention are discussed in greater detail below. The accompanying drawings are incorporated in and constitute a part of this specification, and illustrate one or more embodiments of the invention. These drawings, together with the description, serve to explain the principals of the invention.

BRIEF DESCRIPTION OF THE DRAWINGS

A full and enabling disclosure of the present invention, including the best mode thereof, to one of ordinary skill in the art, is set forth more particularly in the remainder of this specification, including reference to the accompanying drawings, in which.

Figure 1:
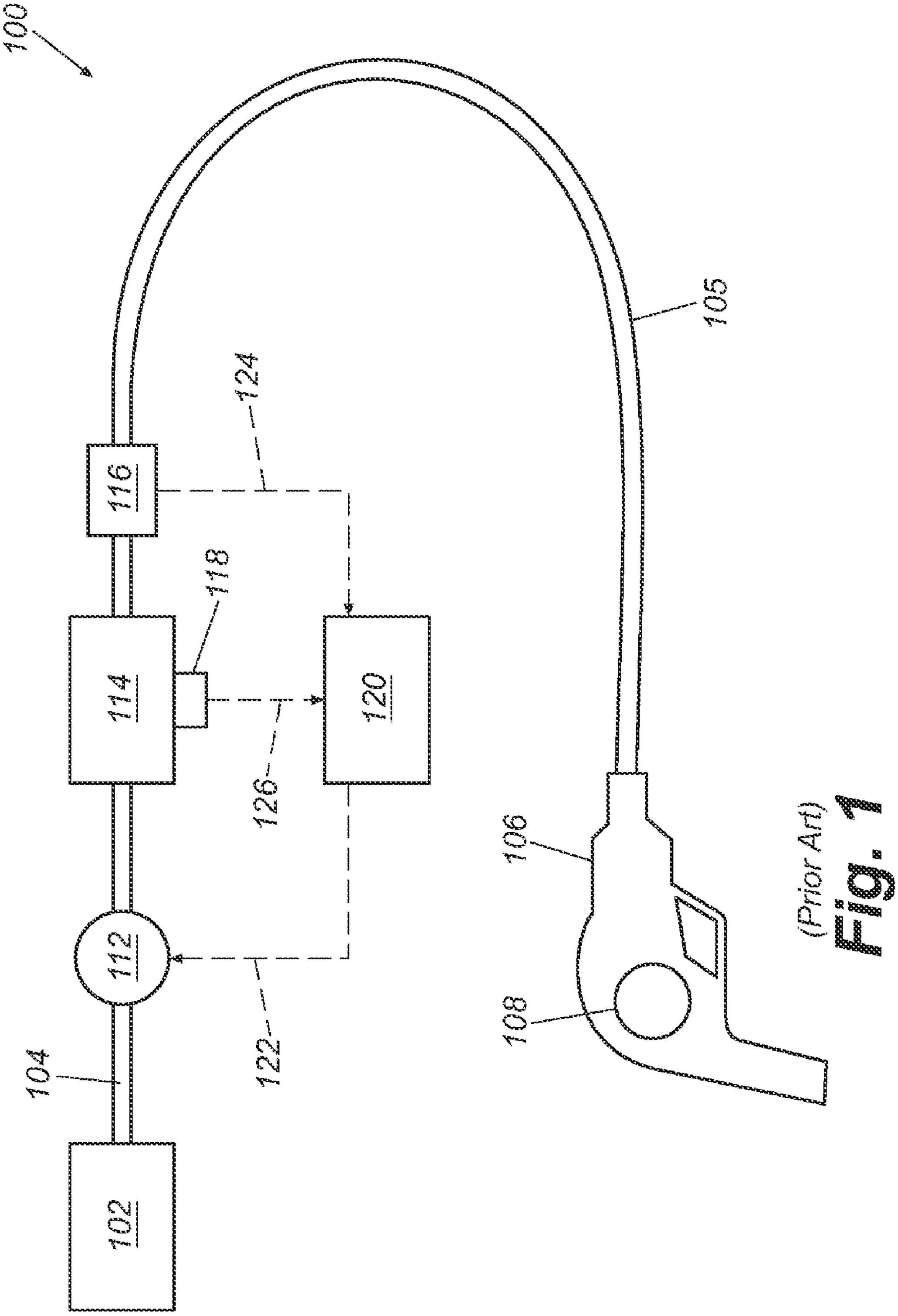
(Prior Art) Fig. 1
FIG. 1 is a schematic diagram of a prior art fuel dispenser.
Figure 2:
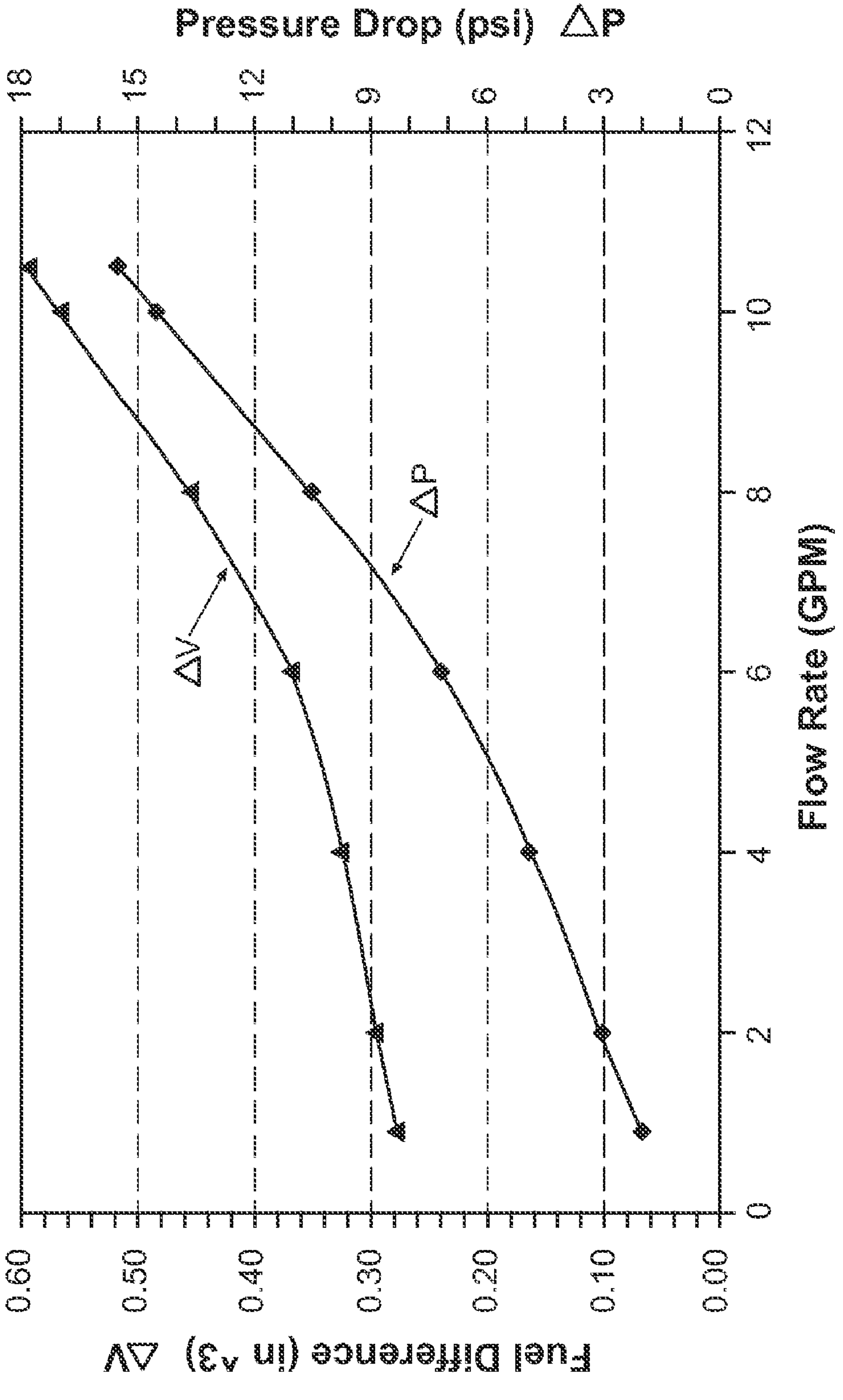
FIG. 2 is a graph depicting the relationship between the flow rates at which the fuel dispenser as shown in FIG. 1 dispenses fuel, the pressure differentials that develop within the fuel dispenser and the resulting differences with regard to the amount of fuel actually dispensed as compared to the measured value of fuel dispensed.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
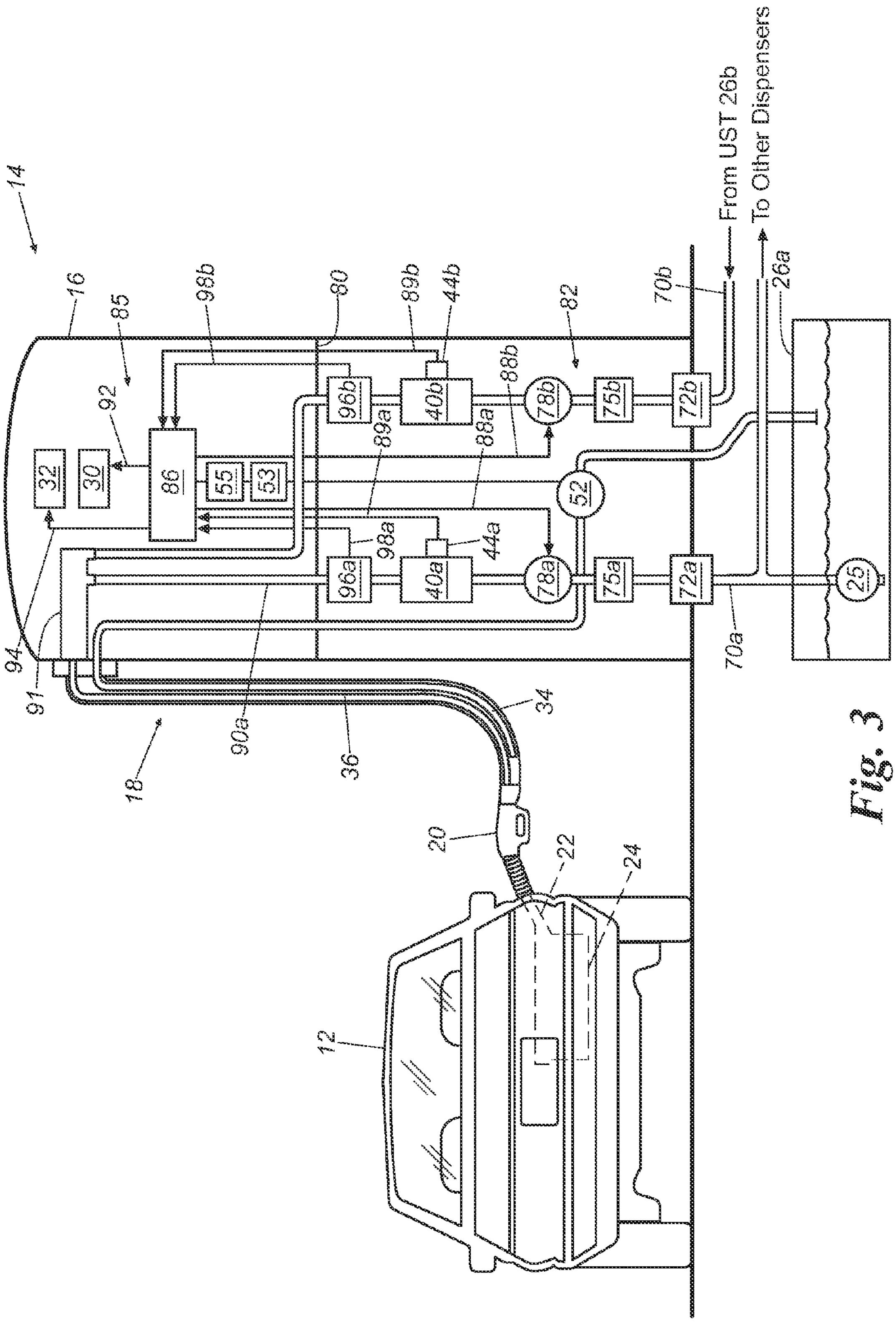
FIG. 3 illustrates a fuel dispenser in accordance with an embodiment of the present invention.
Figure 4:
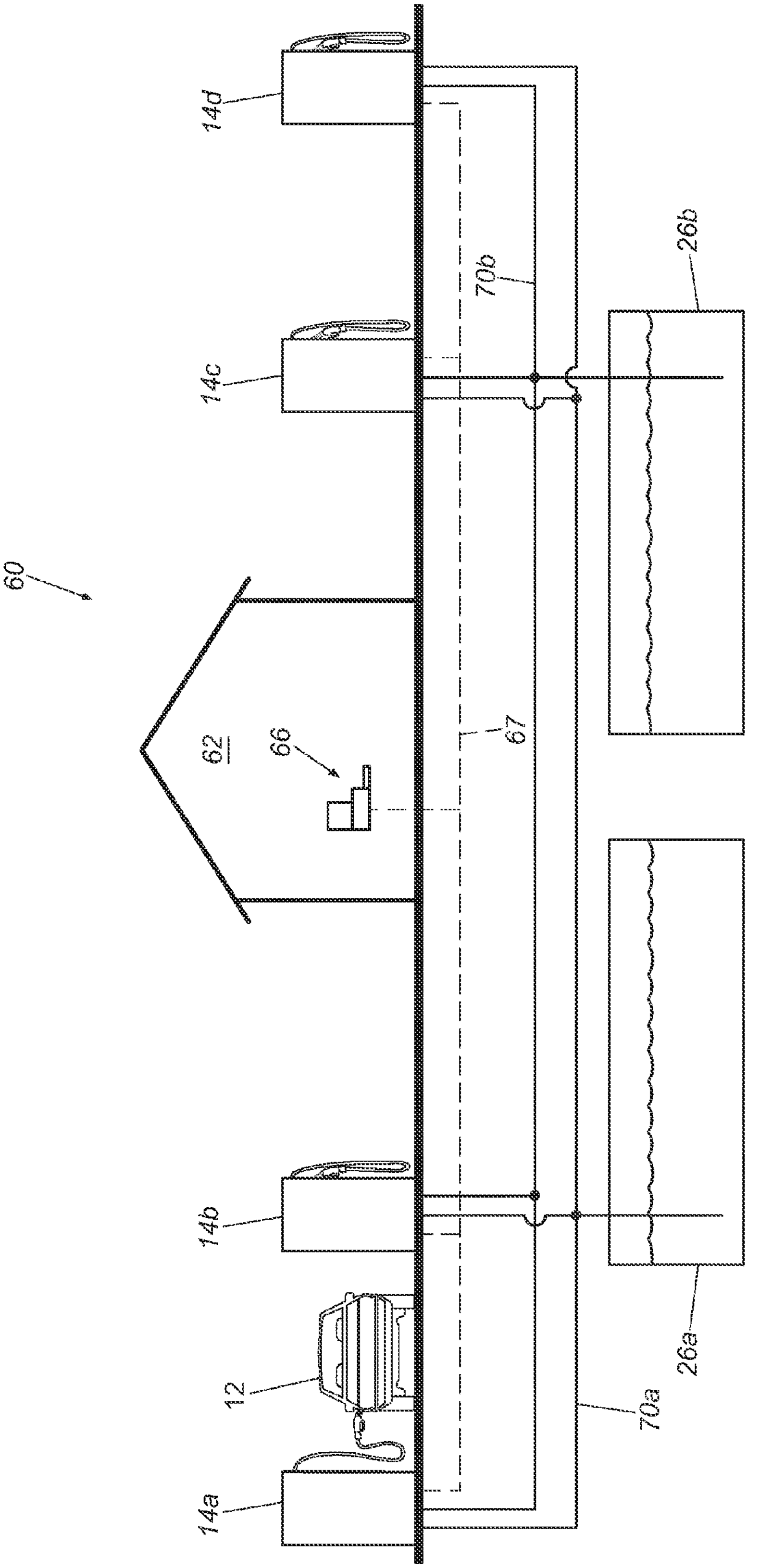
FIG. 4 illustrates a fueling environment including the fuel dispenser as shown in FIG. 3.

FIGS. 3 and 4 illustrate a fueling environment 60 including a central fuel station building 62 with a fuel station computer 66 in communication with a plurality of fuel dispensers 14*a* through 14*d*, with a vehicle 12 being fueled by fuel dispenser 14*a*. Fuel dispenser 14*a* includes a housing 16 with a flexible fuel hose 18 extending therefrom. Fuel hose 18 terminates in a manually operated nozzle 20 adapted to be inserted into a fill neck 22 of vehicle 12. Fuel flows from an underground storage tank 26 through fuel dispenser 14*a*, out through flexible fuel hose 18, down fill neck 22 to a fuel tank 24 of vehicle 12, as is well understood. Fuel dispenser 14*a* may be the ECLIPSE® or ENCORE® sold by the assignee of the present invention, or other fuel dispenser, such as that disclosed in U.S. Pat. No. 4,978,029, which is hereby incorporated by reference in its entirety.

The internal fuel flow components of one example of the present invention are illustrated in FIG. 3. As shown, fuel travels from one or more underground storage tanks 26*a* and 26*b* (FIG. 4) by way of fuel pipes 70*a* and 70*b* associated with their respective underground storage tank. Fuel pipes 70*a* and 70*b* may be double-walled pipes having secondary containment, as is well known. An exemplary underground fuel delivery system is illustrated in U.S. Pat. No. 6,435,204, which is hereby incorporated by reference in its entirety. As shown, a submersible turbine pump 25 associated with underground storage tank 26*a* is used to pump fuel to fuel dispenser 14*a* through fuel pipe 70*a*. Similarly, a submersible turbine pump (not shown) pumps fuel to fuel dispenser 14*a* through fuel pipe 70*b*. Alternately, some fuel dispensers may be self-contained, meaning fuel is drawn to the fuel dispenser by a pump controlled by a motor (not shown) positioned within the housing.

Fuel pipes 70*a* and 70*b* pass into housing 16 through shear valves 72*a* and 72*b*, respectively. Shear valves 72*a* and 72*b* are designed to cut off fuel flowing through their respective fuel pipes 70*a* and 70*b* if fuel dispenser 14*a* is impacted, as is commonly known in the industry. An exemplary embodiment of a shear valve is disclosed in U.S. Pat. No. 6,575,206, which is hereby incorporated by reference in its entirety. The dual fuel flow paths from underground storage tanks 26*a* and 26*b* to fuel nozzle 20 are substantially similar, and as such, for ease of description, only the flow path from underground storage tank 26*a* is discussed now. A fuel filter 75*a* and a proportional valve 78*a* are positioned along fuel line 70*a* upstream of fuel meter 40*a*. Alternatively, proportional valve 78*a* may be positioned downstream of fuel meter 40. Fuel meter 40*a* and proportional valve 78*a* are positioned in a fuel handling compartment 82 of housing 16. Fuel handling compartment 82 is isolated from an electronics compartment 85 located above a vapor barrier 80. Fuel handling compartment 82 is isolated from sparks or other events that may cause combustion of fuel vapors, as is well understood and as is described in U.S. Pat. No. 5,717,564, which is hereby incorporated by reference in its entirety.

Fuel meter 40*a* communicates through vapor barrier 80 via a pulser signal line 89*a* to a control system 86 that is typically positioned within electronics compartment 85 of fuel dispenser 14. Control system 86 may be a microcontroller, a microprocessor, or other electronics with associated memory and software programs running thereon. Control system 86 typically controls aspects of fuel dispenser 14, such as gallons display 30, price display 32, receipt of payment transactions, and the like, based on fuel flow information received from fuel meter 40*a*.

Control system 86 regulates proportional valve 78*a*, via a valve communication line 88*a*, to open and close during fueling operations. Proportional valve 78*a* may be a proportional solenoid controlled valve, such as described in U.S. Pat. No. 5,954,080, which is incorporated herein by reference in its entirety. As control system 86 directs proportional valve 78*a* to open to allow increased fuel flow, the fuel enters proportional valve 78*a* and exists into fuel meter 40*a*. The flow rate of the displaced volume of the fuel is measured by fuel meter 40*a* which communicates the flow rate of the displaced volume of fuel to control system 86 via pulser signal line 89*a*. A pulse signal is generated on pulser signal line 89*a* in the example illustrated, such as by a Hall-effect sensor as described in U.S. Pat. No. 7,028,561, which is incorporated herein by reference in its entirety. In this manner, control system 86 uses the pulser signal from pulser signal line 89*a* to determine the flow rate of fuel flowing through fuel dispenser 14*a* and being delivered to vehicle 12. Control system 86 updates the total gallons dispensed on gallons display 30 via a gallons display communication line 92, as well as the price of fuel dispensed on price display 32 via a price display communication line 94.

Rather than incorporating a physical sensor as a pulser, additional embodiments of the present invention may have a fuel meter included in application software of an associated microcontroller, microprocessor or electronics, that functions as the pulser. In these embodiments, a pulse signal is generated by the software that mimics the output of the physical sensor described above. As well, the software in these additional embodiments can be used to calculate the volume of fuel flowing through the fuel meter and provide this information to the control system.

As fuel leaves fuel meter 40*a*, the fuel enters a flow switch 96*a*. Flow switch 96*a* generates a flow switch communication signal via a flow switch signal line 98*a* to control system 86 to communicate when fuel is flowing through fuel meter 40*a*. The flow switch communication signal indicates to control system 86 that fuel is actually flowing in the fuel delivery path and that subsequent pulser signals from fuel meter 40*a* are due to actual fuel flow. For those embodiments where application software of a microcontroller or microprocessor associated with the fuel meter functions as the pulser, the flow switch sends the flow switch communication signal indicating that flow has been initiated to the fuel meter rather than the control system. The signal indicates to the fuel meter software that it should begin producing output signals to the control system that mimic those of the previously discussed mechanical pursers.

After the fuel enters flow switch 96*a*, it exits through fuel conduit 90*a* to be delivered to a blend manifold 91. Blend manifold 91 receives fuels of varying octane values from the various underground storage tanks and ensures that fuel of the octane level selected by the consumer is delivered to the consumer's vehicle 12. After flowing through blend manifold 91, the fuel passes through fuel hose 18 and nozzle 20 for delivery into fuel tank 24 of vehicle 12. Flexible fuel hose 18 includes a product delivery line 36 and a vapor return line 34. Both lines 34 and 36 are fluidly connected to underground storage tank 26*a* through fuel dispenser 14*a*. Once in fuel dispenser 14*a*, lines 34 and 36 separate.

During delivery of fuel into the vehicle fuel tank, the incoming fuel displaces air in the fuel tank containing fuel vapors. Vapor is recovered from fuel tank 24 of vehicle 12 through vapor return line 34 with the assistance of a vapor pump 52. A motor 53 powers vapor pump 52. As discussed above, control system 86 receives information from fuel meter 40*a* and pulser 44*a* regarding the amount of fuel being dispensed. Fuel meter 40*a* measures the fuel being dispensed while pulser 44*a* generates a pulse per count of fuel meter 40*a*. As shown, pulser 44*a* generates one thousand and twenty-four (1024) pulses per gallon of fuel dispensed. Control system 86 controls a drive pulse source 55 that in turn controls motor 53. As previously noted, control system 86 may be a microprocessor, microcontroller, etc. with an associated memory that operates to control the various functions of the fuel dispenser including, but not limited: fuel transaction authorization, fuel grade selection, display and/or audio control. Vapor recovery pump 52 may be a variable speed pump or a constant speed pump with or without a controlled valve (not shown), as is well known in the art.

In addition to measuring the volume of fuel dispensed, fuel meter 40*a* of the preferred embodiment of the present invention also provides the function of compensating the total dispensed fuel volume, as measured by the fuel meter, in order to offset any inaccuracies caused by nozzle snap events. As previously discussed, nozzle snap events that occur when the flow of fuel through the dispenser's fuel nozzle 20 is terminated tend to allow an unmeasured volume of fuel to pass through fuel meters 40*a* and 40*b* as pressure is equalized within the fuel flow paths of the fuel dispenser. To compensate the total measured volume of fuel that has been dispensed for the unmeasured volume of fuel due to the nozzle snap event, fuel meters 40*a* and 40*b* measure various flow parameters within their respective fuel flow paths when the nozzle snap event occurs and retrieve a fuel volume compensation value ($\Delta V$) that corresponds to the measured flow parameters. The fuel volume compensation values ($\Delta V$) are retrieved from experimental data that is compiled through testing and then embedded in software of the fuel meters 40*a* and 40*b*. The fuel volume compensation values ($\Delta V$) are then added to the volume of fuel dispensed that was measured by fuel meters 40*a* and 40*b* up until the occurrence of the nozzle snap event. The fuel meters perform this function for each nozzle snap event.

Figure 5:
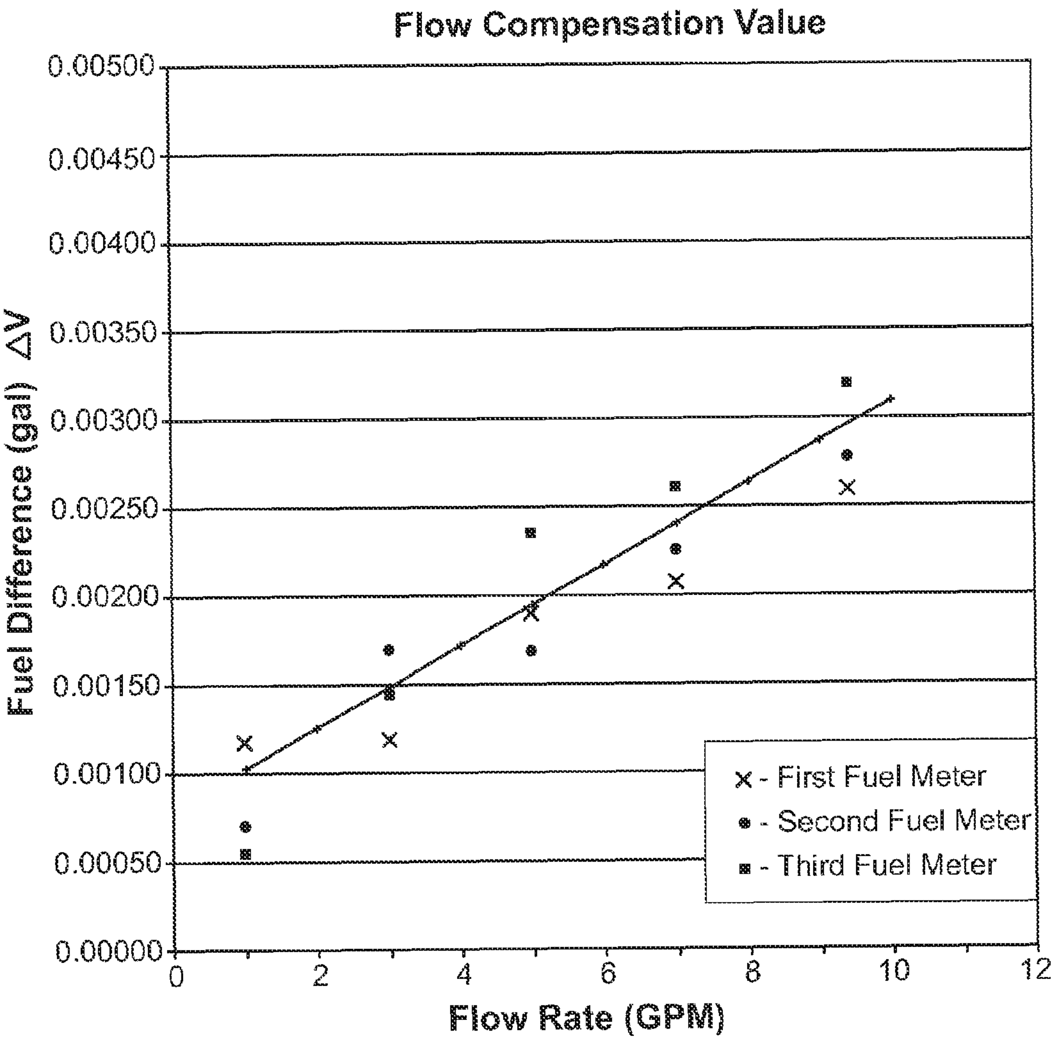
FIG. 5 is a graph showing flow compensation values corresponding to the operating fluid flow rates for the fuel dispenser as shown in FIG. 3.

FIG. 5 provides a graphical representation of fuel volume compensation value ($\Delta V$) data as would be embedded in the software of the fuel meter of an exemplary embodiment of the present invention. Referring also to the flow chart shown in FIG. 7, one method of creating the fuel volume compensation value ($\Delta V$) table as shown in FIG. 5, the fuel volume compensation value ($\Delta V$) data table is created by first selecting a desired number of meters of the same type and model, for testing, as shown at step 200, each fuel meter falling within acceptable calibration standards for that model. Next, as shown at step 202, each fuel meter is installed in a test fuel dispensing system and data points are collected for individual nozzle snap events at various fuel flow rates for that meter. For example, as seen in FIG. 5, data points (represented by "x") are collected for a first fuel meter at intervals of one gallon per minute flow rate from between one gallon per minute to 10 gallons per minute. As shown at step 204, for each data point, fuel is dispensed into a measuring device, such as a graduated container, at different flow rates with no or minimum nozzle snap events. At step 206, volume of fuel dispensed as measured by the fuel meter will be compared to the actual volume of fuel dispensed into the measuring device.

As previously discussed, occurrence of the nozzle snap event will typically lead to an unmeasured volume of fuel passing through the fuel meter as pressure within the fuel flow path is equalized after the flow of fuel is terminated. At step 208, for each data point, fuel is dispensed into the same size graduated measuring device that was used at step 204, at the different flow rates with multiple, for example 10, nozzle snaps. At step 210, volume of fuel dispensed, as measured by the fuel meter, is compared to the actual volume of fuel dispensed into the measuring device. To determine the unmeasured volume of fuel that was caused by the nozzle snap events, the volume of fuel dispensed, as measured by the fuel meter, is subtracted from the actual volume of fuel that was delivered to the graduated measuring device for both tests without (steps 204 and 206), and with (steps 208 and 210), nozzle snaps, as shown in step 212. This volume is then divided by the number of nozzle snap events from step 208 to determine a fuel volume compensation value per nozzle snap event. As shown in FIG. 5, this process is repeated at the selected interval of fuel flow rates, over the operating range of the fuel dispenser, as shown in step 214.

Figure 7:
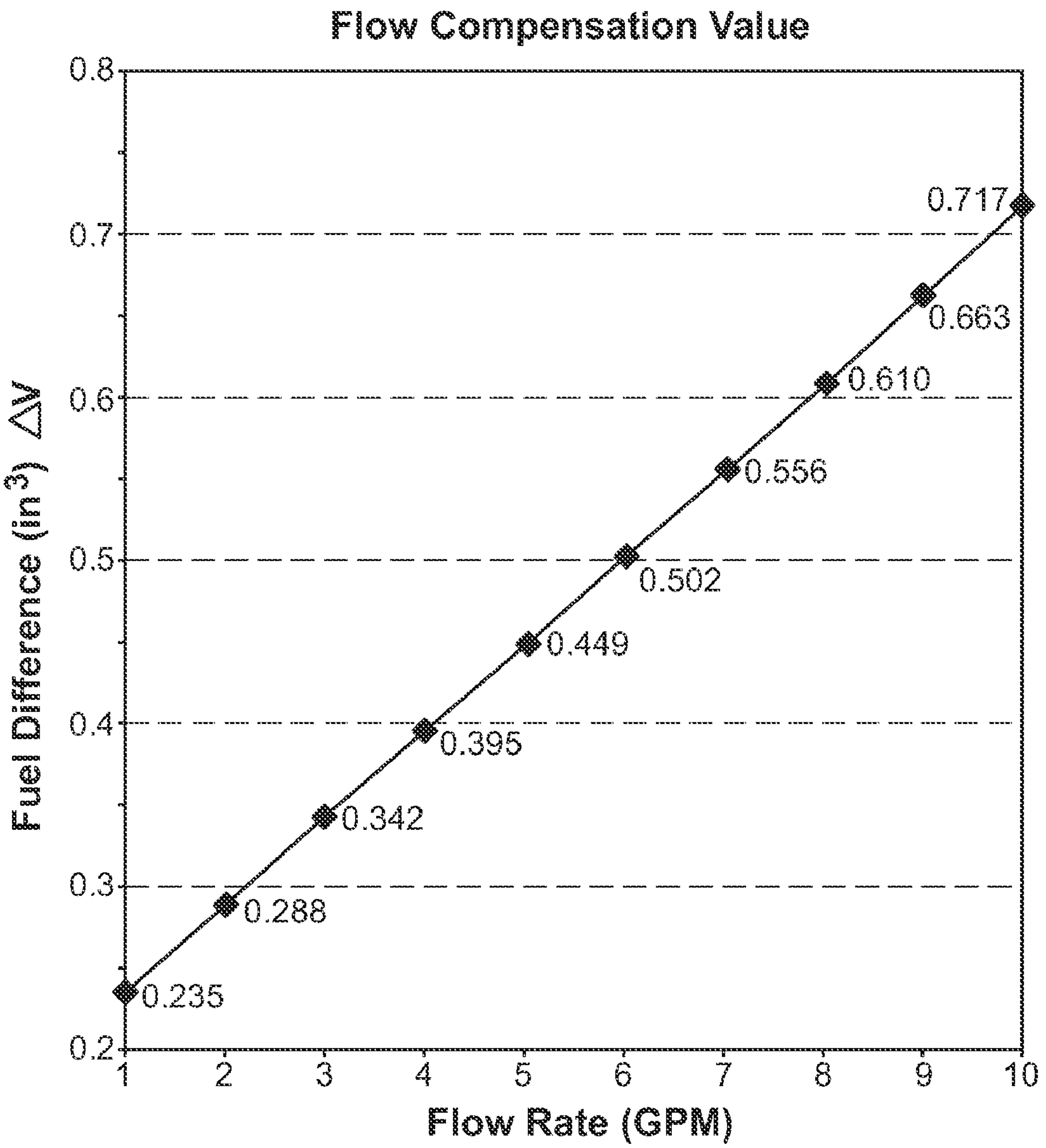
FIG. 7 is a graph showing flow compensation values corresponding to the operating fluid flow rates for the fuel dispenser as shown in FIG. 3.

The process of collecting data points discussed above is repeated for each of the selected fuel meters (in the instant case, second fuel meter and third fuel meter), as shown at step 216. As would be expected, minor variations from meter to meter can occur for given fuel flow rates, resulting in a spread of data points, as shown in FIG. 5. As such, as shown at step 216, a curve is fit to the spread of data points so that fuel flow compensation values (ΔV) are available across the continuous range of fuel flow rates in which the fuel meters and their associated dispensers operate. As shown in FIGS. 5 and 7, fuel flow compensation values (ΔV) can be recorded in different units of measure, such as cubic inches ($in^3$) or gallons (gal).

Note, FIGS. 5 and 7 are merely graphical representations of an exemplary embodiment of a fuel flow compensation data table in accordance with the present invention. Fuel flow compensation data tables can be compiled for any number of fuel meters, including a single fluid fuel meter. As well, data points can be compiled for various flow rate intervals, such as at each half gallon per minute.

Figure 8:
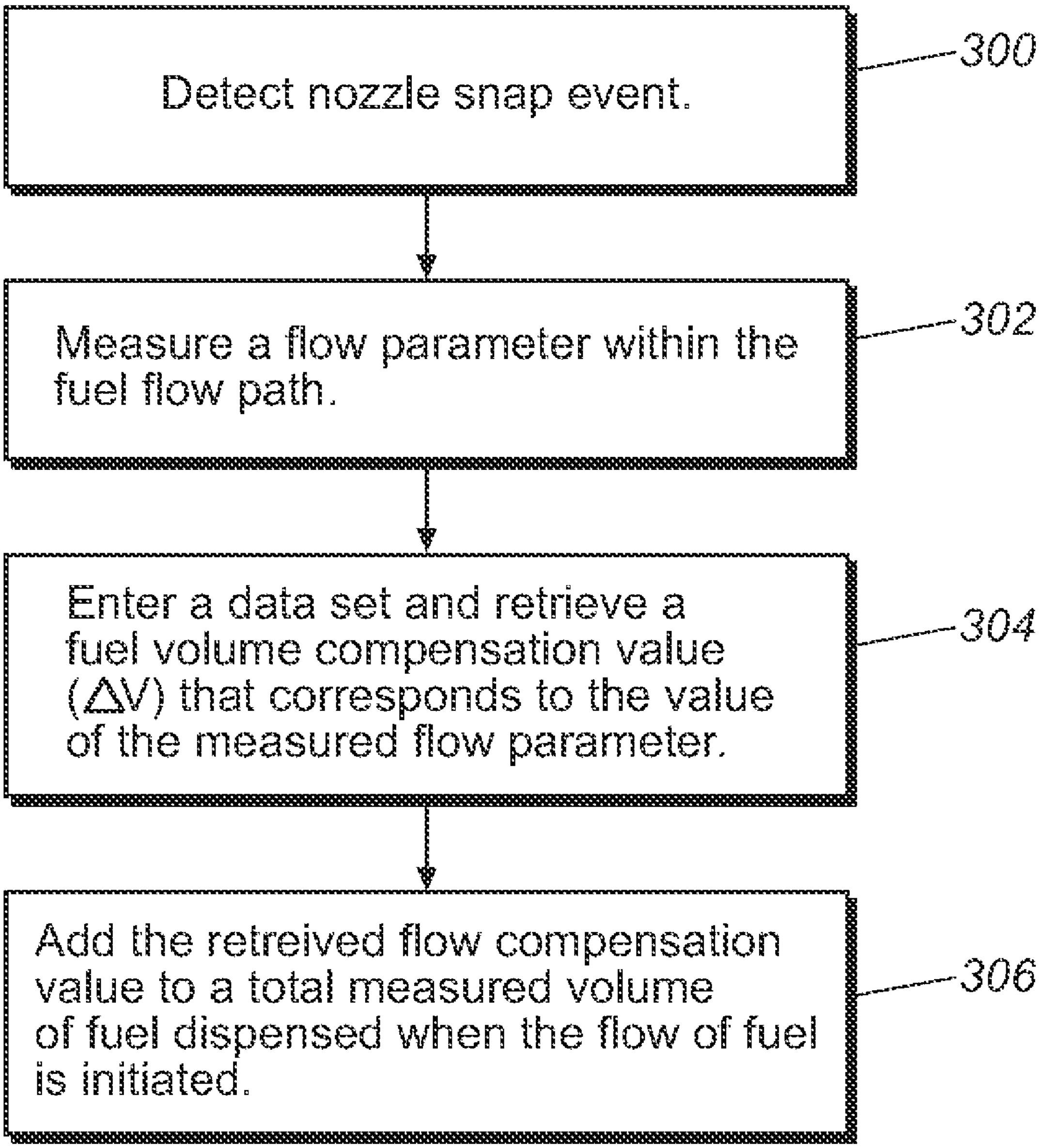
FIG. 8 is a flow chart depicting a method of accounting for fuel measurement inaccuracies in accordance with an embodiment of the present invention.

Referring now to the flow chart shown in FIG. 8, the method by which the fuel meters of the disclosed fuel dispenser compensate the total volume of fuel dispensed, as measured by the fuel meter, in order to offset any inaccuracies caused by nozzle snap events is discussed. As previously noted, nozzle snap events that occur when the flow of fuel through the dispenser fuel nozzle is secured may lead to an unmeasured volume of fuel passing through the fuel meter. To account for these potential inaccuracies, the fuel dispenser detects when a nozzle snap event occurs during the dispensing of fuel, as shown at step 300. In the disclosed embodiments, the nozzle snap event is detected by flow switch 116 which detects the decrease in the flow of fuel as flow is terminated by fuel valve 108, and a signal is sent to a respective fuel meter 40*a* or 40*b* or, control system 86. Next, as shown in step 302, the respective fuel meter 40*a* or 40*b* measures at least one flow parameter within the fuel flow path at the time of the nozzle snap event. In the preferred embodiment discussed herein, the fuel meter determines the flow rate at which fuel is being dispensed at the instant fuel valve 108 undergoes the nozzle snap event.

Next, as shown at step 304, the microprocessor, microcontroller or electronics associated with the fuel meter enters the fuel volume compensation value data set discussed above and graphically shown in FIGS. 5 and 7, and retrieves a fuel volume compensation value (ΔV) that corresponds to the value of the measured flow parameter. For example, from the data set as shown in FIG. 7, for a flow rate of 8 gpm, the control system would retrieve a fuel volume compensation value (ΔV) of 0.610 $in^3$, which is readily convertible into gallon units. Preferably, the flow compensation value data set is embedded in software, firmware, etc., within the fuel meter. As shown at step 306, the retrieved fuel volume compensation value (ΔV) is added to the volume of fuel dispensed, as measured by the fuel meter, the next time flow is initiated. The fuel meter performs the discussed sequence of steps for each nozzle snap event that occurs during each fueling operation of the fuel dispenser.

Referring back to FIG. 4, rather than being embedded in the software of each individual fuel meter, it is also possible that the discussed flow compensation value data set be embedded in software that is in the control system or that is remote from the fuel dispensers, such as the software that is contained within fuel station computer 66. As shown, fuel station computer 66 is in communication with individual fuel dispensers 14*a*, 14*b*, 14*c* and 14*d* via communication line 67.

Figure 6:
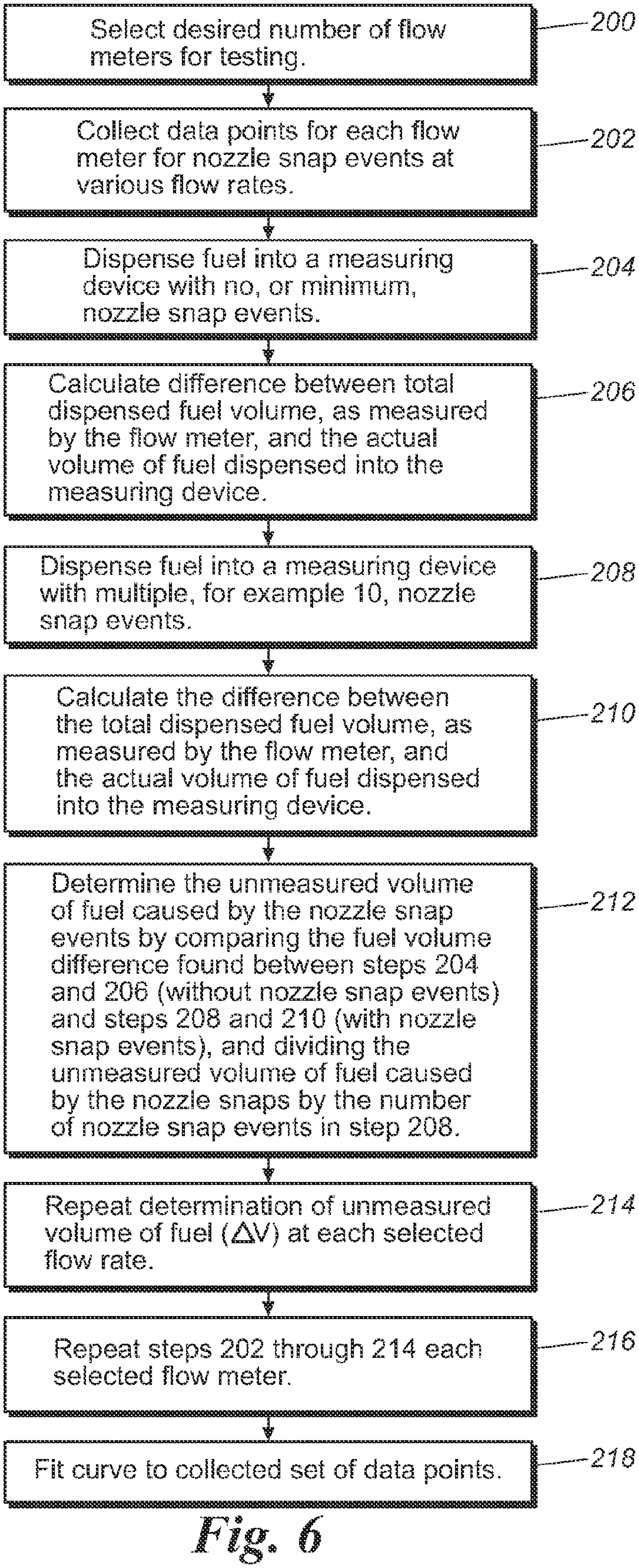
FIG. 6 is a flow chart depicting a method of creating the graph as shown in FIG. 5.

As well, embodiments of the present invention are envisioned that include multiple flow compensation value data sets for a given fuel dispenser. An alternate embodiment of the present invention can include multiple data tables that are compiled in the manner previously discussed with regard to FIG. 6, with the exception that alternate data tables are compiled as a second fuel flow parameter is incrementally varied. For example, multiple tables an be created over a given range of flow rate, each table corresponding to a difference fuel temperature. As such, in addition to entering the flow compensation value table with the measured fuel flow rate at the time of the nozzle snap event, the fuel meter microprocessor, microcontroller or electronics may also select which one of the fuel volume compensation value data sets should be entered based on the second measured parameter. For example, multiple tables can be compiled for various fuel temperatures, wherein the fuel meter determines which table to enter with the measured flow rate based on the temperature of the fuel at the instant of the nozzle snap event.

While preferred embodiments of the invention have been shown and described, modifications and variations thereto may be practiced by those of ordinary skill in the art without departing from the spirit and scope of the present invention, which is more particularly set forth in the appended claims. In addition, it should be understood the aspects of the various embodiments may be interchanged without departing from the scope of the present invention. Furthermore, those of ordinary skill in the art will appreciate that the foregoing description is by way of example only, and is not intended to limit the invention as further described in such appended claims.

What is claimed is:

1. A fuel dispenser configured to compensate a total dispensed fuel volume for an event that occurs during a fueling process, the fuel dispenser comprising:

a fuel delivery path configured to deliver fuel to a vehicle;

a display configured to display the total dispensed fuel volume;

a fuel meter configured to measure a fuel delivery rate at which fuel is being dispensed through the fuel delivery path to the vehicle;

a data set having a plurality of fuel volume compensation values corresponding to a plurality of fuel delivery rate values; and a microprocessor configured to calculate a volume of fuel dispensed to the vehicle based on the fuel delivery rate and retrieve a fuel volume compensation value from the data set, wherein the fuel meter measures the fuel delivery rate at the time of the event, the microprocessor determines which fuel delivery rate value corresponds to the fuel delivery rate, retrieves the corresponding fuel volume compensation value, and adds the retrieved fuel volume compensation value to the volume of fuel dispensed as calculated by the microprocessor to obtain the total dispensed fuel volume.

2. The fuel dispenser of claim 1, wherein the event that occurs during the fueling process is a termination of the flow of fuel.

3. The fuel dispenser of claim 1, wherein the microprocessor is a component of the fuel meter.

4. The fuel dispenser of claim 1, further comprising a control system that is remote from the fuel meter and the microprocessor is a component of the control system.

5. The fuel dispenser of claim 1, wherein the data set is embedded in software of the microprocessor.

6. A method of compensating a volume of fuel measured by a fuel meter to obtain a total dispensed fuel volume for a fuel dispenser including a fuel flow path for dispensing fuel, comprising:

detecting an event that occurs during a fueling operation, the event being detected by a sensor;

measuring a fuel delivery rate of the fuel within the fuel flow path at the time of the event;

retrieving a fuel volume compensation value from a data set including a plurality of fuel volume compensation values that correspond to a plurality of fuel delivery rate values; and adding the retrieved fuel volume compensation value to the volume of fuel measured by the fuel meter to obtain a total dispensed fuel volume, wherein the retrieved fuel volume compensation value is selected by comparing the measured fuel delivery rate to the plurality of fuel delivery rate values in the data set.

7. The method of claim 6, wherein detecting the event further comprises detecting a termination of the flow of the fuel.

8. The method of claim 7, wherein detecting the event further comprises detecting multiple terminations of the flow of the fuel during the fueling operation.

9. The method of claim 7, wherein adding the retrieved fuel volume compensation value occurs when fuel flow is reinitiated subsequent to the termination of the flow of the fuel.

10. The method of claim 7, wherein the sensor that detects the termination of the flow of the fuel comprises a flow switch.

* * * * *